Patented Jan. 3, 1939

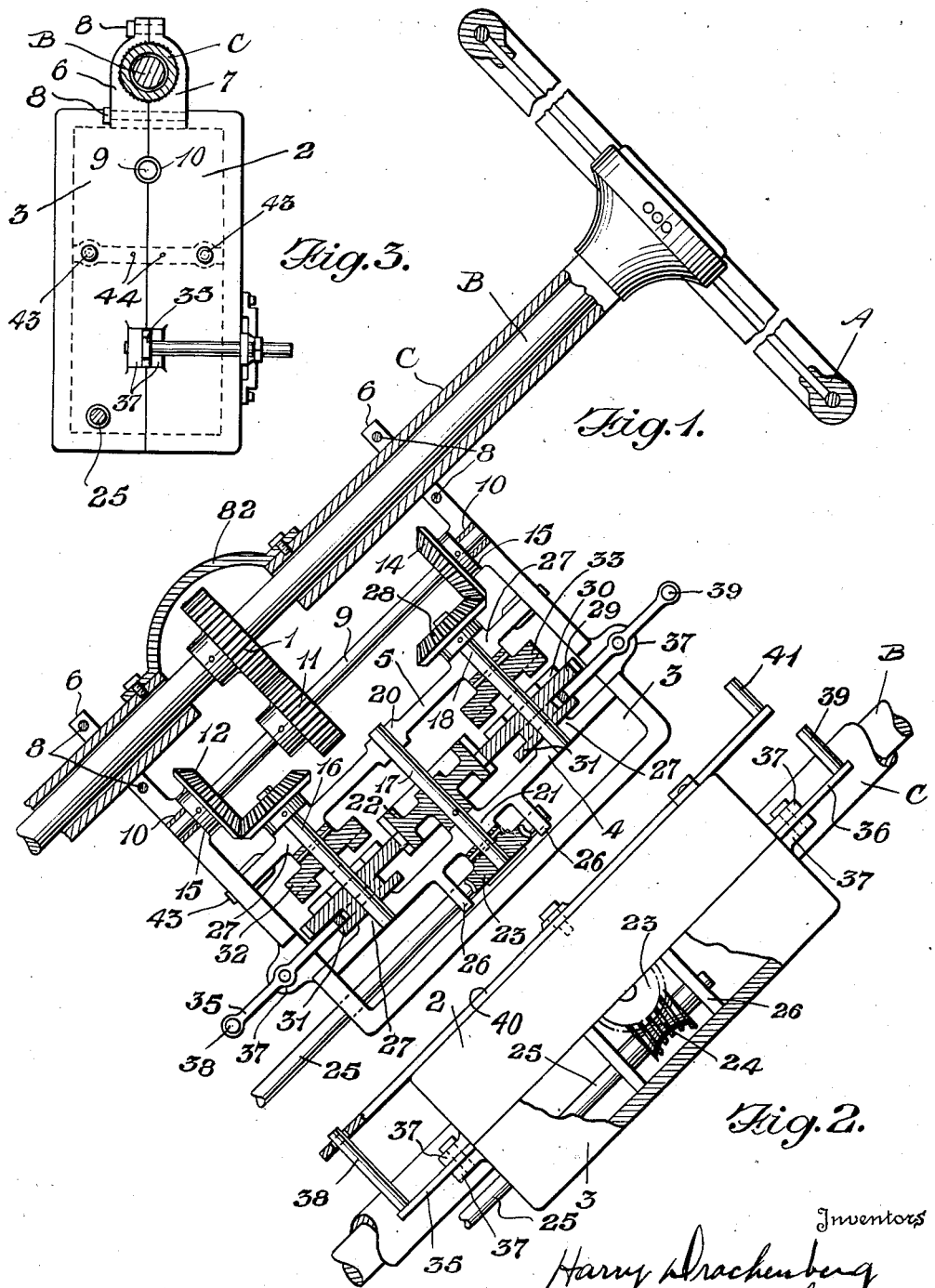

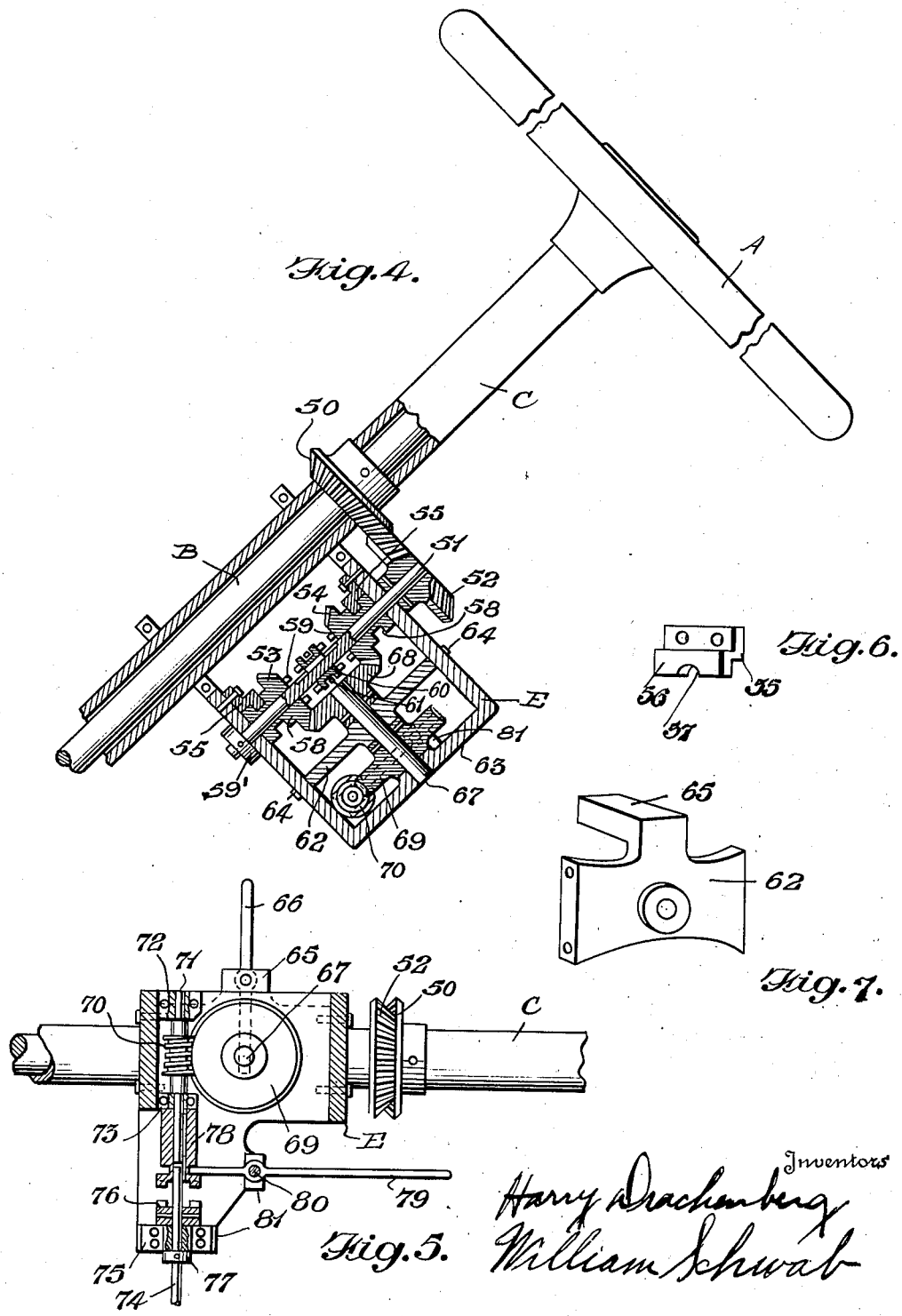

2,142,266

UNITED STATES PATENT OFFICE 2,142,266

STEERING MECHANISM FOR PARKING AUTOMOBILES

Harry Drachenberg and William Schwab, Cincinnati, Ohio

Application December 1, 1937, Serial No. 177,549

7 Claims. (Cl. 180—79.3)

This invention relates to means for applying power to the steering mechanism of motor vehicles and includes a structure suitable for use in conventional steering assemblies to selectively apply power to the steering shaft or column to facilitate the operation of same.

More specifically the present invention embodies the use of selective gearing, operated from any suitable source, as from the vehicle driving engine, electric motor, hydraulic motor, or similar means, to turn the steering shaft or column at the will of the operator, and without interference with the manual control but if desirable in conjunction therewith.

Among the objects of this invention are the adjustable mounting on the steering shaft or column, the simplified gearing and clutch mechanism, the novel form of casing for the gearing, and the mounting of the shifting mechanism.

Other features will more clearly hereinafter appear, by reference to the accompanying drawings, forming a part of this specification and wherein like characters of reference designate corresponding parts throughout the several views, in which Fig. 1 is a longitudinal view with half the casing removed and with parts of the mechanism in section.

Fig. 2 is an end view partly in section.
Fig. 3 is a bottom plan view.

Fig. 4 is a longitudinal section of a modified form.

Fig. 5 is a transverse section of the modified form shown in Fig. 4.
Fig. 6 is a perspective view of a gear clamp, and Fig. 7 is a perspective of the partition.

With reference to that form of the device shown in Figures 1 and 2 the steering wheel is indicated at A, the steering rod B and the steering rod casing at C. The casing C is interrupted at a predetermined point in its length to expose a portion of the steering rod B, and to provide for the mounting of a spur gear 1, which is pinned or keyed thereto as desired.

The power drive for the steering rod is through the spur gear 1, and this driving mechanism is mounted and enclosed in a casing formed of sections 2 and 3. This casing is provided with spaced removable vertical partitions 4 and 5 each of which is formed with openings and extensions for accommodating or supporting various elements included in the assembly. In addition each casing section has spaced jaw sections 6 and 7 which jaw sections cooperate to clamp about the casing C of the steering rod on each side of the spur gear 1, and suitable bolts 8 secure the parts together and mount the assembly.

Within the casing above described and parallel to the steering rod is the rotatable shaft 9 mounted at each end in any suitable type of bearing indicated conventionally at 10. On this shaft 9 is fixed the spur gear 11 which meshes with the spur gear 1 on the steering rod B. Bevel gears 12 and 14 are mounted on and fixed to the shaft 9 adjacent the inner wall faces and abut against the bearing projections 15. Referring now to the spaced vertical partitions 4 and 5 it will be noted that these partitions have mounted therein and support the three parallel spaced shafts 16, 17 and 18 which are arranged at 90° to the shaft 9. All three shafts 16, 17 and 18 are mounted in suitable bearings in the partitions, the details of which are omitted from the present disclosure, it being sufficient that the bearings be suitable to permit the rotation of the shafts during the life of the apparatus.

The center shaft 17 is supported at its inner end by the bearing 20 and adjacent the outer end by the bearing 21 in wall 4. A spur gear 22 is pinned or keyed to the shaft 17 at a point intermediate the partitions 4 and 5 and a worm wheel 23 is fixed to the outer end of the shaft 17 which projects through the wall 4. The worm wheel is driven through the worm gear 24 on the driven shaft 25, the latter being mounted in bearings in the parallel projections 26 extending outwardly from the partition 4. The shaft 25 may be driven by electric or hydraulic motor, by the motor vehicle power plant or any other suitable means.

The shafts 16 and 18 are each mounted similarly in suitable bearings 27 in the partitions 4 and 5 and project inwardly of the inward partition 5 to accommodate the bevel gears 28, 28 which are pinned or keyed thereto and which mesh with the bevel gears 12 and 14 on the shaft 9. Spur gears 29, 29 are rotatably and slidably mounted on the shafts 16 and 18 intermediate the partitions 4 and 5 and engage and mesh with opposite faces of the spur gear 22 on shaft 17. Each spur gear 29 is formed on its inner side with a clutch face 30 and on its opposite face with an integral grooved collar 31, which latter cooperate with actuating means hereinafter described.

Clutch elements 32 and 33 are pinned or keyed on the shafts 16 and 18 adjacent the inner wall bearings 27, 27 and are of such construction as to engage with the clutch faces 30, 30 formed on the inner faces of the rotatable and slidable spur gears 29.

For operating this mechanism pivoted levers 35 and 36 are provided. These levers 35 and 36 are pivoted on bolts and between ears 37 extending from opposite ends of each casing section. The inner ends of the levers are forked to engage the annularly grooved collars 31 and the outer ends have projecting shanks 38 and 39. The shank 38 of the lower lever extends beyond the side wall of the casing and is linked to the elongated pivoted lever 40 which extends upwardly adjacent the shank 39. A shank 41 extends from the lever 40 to facilitate operation.

By referring to Figure 3 it will be seen that the bearing plate or partition 5 is removable and is secured in the casing by means of bolts 43 and centering pins 44. The outer partition or bearing plate 4 is preferably cast integral with the casing or housing.

In the modified form shown in Figures 4, 5, 6 and 7 a more simplified and open structure is illustrated. In this assembly a housing E is provided and clamped to the steering rod casing C as in the form heretofore described, except that the housing not being shown as sectional, one-half of each clamp is carried by the casing and the other half is detachable therefrom.

In this structure the steering rod is provided with a bevel gear 50 pinned or keyed thereto and located above the housing. A vertical shaft 51 is rotatably mounted in the upper and lower wall of the housing and extends through the upper wall to carry the bevel gear 52 which latter is fixed thereto in any approved manner. Within the housing are the bevel gears 53 and 54. These gears 53 and 54 are rotatably mounted on the shaft 51 and held in spaced relation by the retainer plates 55 which are bolted to the inner walls of the housing and have flanges 56 notched at 57 (see Fig. 6) to engage the slotted collars 58 formed integral with the gears 53 and 54. The inner faces of the bevel gears 53 and 54 are formed with clutch faces 59 and cooperating with these clutch faces is the double faced splined clutch 60 formed with central intermediate annular groove 61 for cooperation with an actuating lever. This clutch is mounted on the shaft 51 and due to the splined mounting is capable of engagement with either of the clutch faces 59 or an intermediate neutral position. The shaft 51 is held against longitudinal movement by means of the cap or nut 58'.

A removable partition 62 is bolted to the housing inward of the wall by means of bolts 64 and includes an offset inward extension 65 for pivotally mounting the forked control lever 66 which engages in the annular groove 61 of the two faced clutch 60. This extension projects inwardly sufficiently to position the control lever in alignment with the clutch.

A shaft 67 is rotatably mounted in suitable bearings in the partition 62 and the housing wall 68, projecting inwardly of the latter for mounting of the bevel gear 69, the latter being pinned or keyed in place and meshing with the freely mounted bevel gears 53 and 54 on the shaft 51. Between the partition 62 and the housing wall 68 is the worm gear 69 pinned to the shaft 67 and driven by worm gear 70. The worm gear 70 is fixed on shaft 71 and the latter is mounted in suitable bearings in the walls 72 and 73 of the housing. The shaft 71 extends through the wall 73 and is aligned with the extremity of driven shaft 74. The driven shaft 74 is supported in suitable bearings in the housing extension 75 and has fixed thereto adjacent the inner face of the housing extension 75 a clutch element 76. This clutch element 76 locks the shaft against inner longitudinal movement and the collar 77 prevents outer longitudinal movement. A clutch element 78 is splined to the projecting end of the shaft 71 and is arranged for movement over the adjacent shaft extremity 74 to permit cooperative engagement with the clutch element 76. A clutch shift lever 79 is pivoted at 80 to the housing projection 81 to manipulate the splined clutch element 78.

The operation of both forms of the invention is quite similar. In the first form as shown in Figs. 1, 2 and 3, presuming that it is desired to apply power to the steering rod and the drive rod 25 is connected to and operated by such power, the operator by the shifting of either control lever 39 or 41 will cause the steering rod to be turned either to the right or left as desired. In the form of the invention illustrated by Figures 4, 5, 6 and 7 the power shaft can first be coupled by actuation of lever 79 and then the steering rod rotated either to the left or right as desired by movement of lever 66, which actuates the two faced clutch member 60.

It will be noted that in each modification there is a removable partition which supports the various shafts and thus the assembly or removal and replacement of parts is facilitated.

Minor changes in the details of construction may be made without departing from the spirit of the invention, it being obvious that such elements as the casing section 82 or the bearings utilized may be altered as necessity may demand.

What we claim as new and desire to secure by Letters Patent is:—

1. A power steering mechanism including in combination, a rotatable steering rod and a casing therefor, a gear fixed on said steering rod, a housing mounted on said casing, a rotatable shaft arranged parallel to said steering rod mounted in said housing, a gear fixed on said shaft in mesh with the gear on said steering rod, a pair of gears on said rotatable shaft spaced from said first named gear, power driven means for selectively driving the spaced gears in opposite directions, and manually operated means for controlling said power driven means.

2. The substance of claim 1 characterized in that the control means includes a clutch actuated from without the housing.

3. In combination with a rotatable steering rod, a casing therefor, a gear fixed on said rod, a housing secured to said casing, a rotatable shaft arranged parallel to said rod and mounted in the walls of said housing, a gear fixed on said shaft in mesh with the gear on said rod, a pair of gears on said rod spaced from the fixed gear, a partition removably positioned in said housing, a pair of shafts supported by said partition, gears on the inner extremities of said shafts meshing with the pair of gears on said rotatable shaft, means for driving the gears on said shaft extremities in opposite directions, a power shaft, and means for connecting the power shaft and said driving means.

4. The substance of claim 3 characterized in that clutches are provided for selectively driving the gears on said shaft extremities.

5. In a power driven steering mechanism, a rotatable steering rod, a gear fixed on said rod, a housing supported adjacent the steering rod, a rotatable shaft mounted in the housing and arranged parallel to said steering rod, a gear fixed on said rotatable shaft in mesh with the gear on said steering rod, a pair of inwardly facing beveled gears on said shaft having inner clutch faces, a two-way clutch element on said shaft selectively engageable with the clutch faces on said gears, a removable partition in said housing, a rotatable shaft supported by said partition, a beveled gear fixed on one end of said shaft normally engaging each of the inwardly facing beveled gears, a worm gear fixed on the opposite end of said shaft, a drive shaft, a worm gear fixed on said shaft meshing with the first mentioned worm gear, a power shaft, and coupling means between the power and drive shafts.

6. The substance of claim 5 characterized in that the clutch element and coupling means are actuated by independent manually operated means.

7. A power drive for motor vehicle steering mechanism comprising in combination, a rotatable steering rod, a gear fixed on said rod, a housing, a rotatable shaft arranged in said housing, a gear fixed on said shaft in mesh with the gear on said rod, an additional pair of gears fixed on said shaft, partitions positioned in said housing, a pair of rotatable shafts supported by said partitions, gears fixed on the inner extremities of said partition supported shafts meshing with the pair of gears on said rotatable shaft, means for driving said pair of rotatable partition supported shafts in opposite directions including oppositely driven freely mounted gears on each shaft and independent means for selectively locking said shafts to said freely mounted gears.

HARRY DRACHENBERG.
WILLIAM SCHWAB.